Patented Nov. 11, 1924.

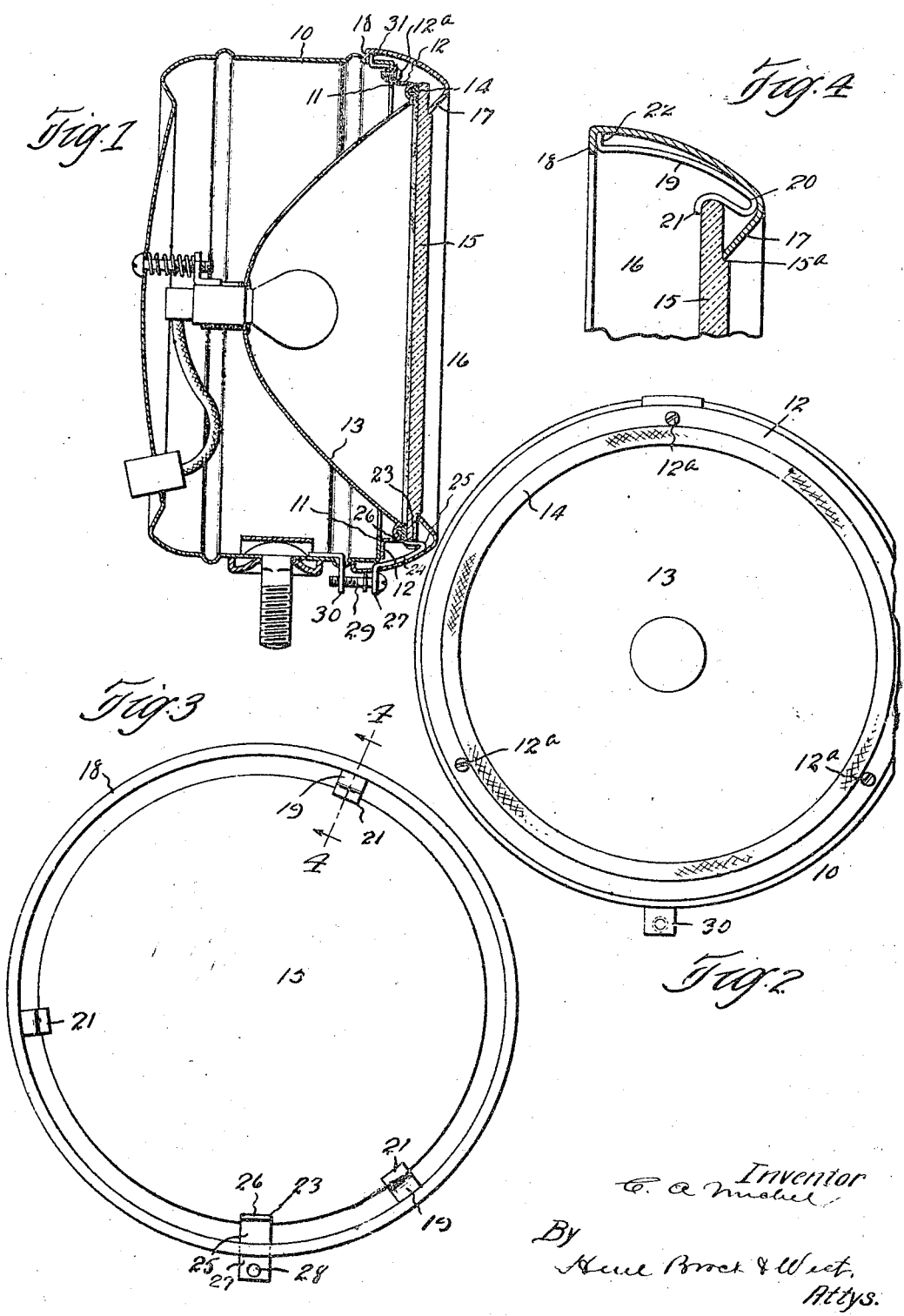

1,515,156

UNITED STATES PATENT OFFICE.

CLARENCE A. MICHEL, OF CLEVELAND, OHIO, ASSIGNOR TO THE GUIDE MOTOR LAMP MANUFACTURING COMPANY, OF CLEVELAND, OHIO, A CORPORATION OF OHIO.

AUTOMOBILE LAMP.

Application filed October 13, 1922. Serial No. 594,233.

*To all whom it may concern:*

Be it known that I, CLARENCE A. MICHEL, a citizen of the United States, residing at Cleveland, in the county of Cuyahoga and State of Ohio, have invented a certain new and useful Improvement in Automobile Lamps, of which the following is a full, clear, and exact description, reference being had to the accompanying drawings.

This invention relates generally to automobile lamps and more particularly to the manner of securing the glass in the door or front frame of the lamp, and also in the manner of connecting the door or front frame to the casing of the lamp. The object of the invention is to provide an exceedingly cheap, simple and efficient means for securing the glass in the frame and holding the same against rattling and turning. Another object of the invention is to provide a novel fastening means for connecting the front frame, carrying the glass in such a manner as to hold the frame firmly in position upon the casing and the glass firmly against the forward end of the reflector which in turn is fixedly connected to the casing; and thereby eliminating all rattling and noise in the lamp structure. With these and various other objects in view the invention consists in the novel features of construction and in the manner of combining or arranging the same, all of which will be fully described hereinafter and set forth in the appended claims.

In the drawings forming a part of this specification, Fig. 1 is a sectional view of an automobile lamp constructed in accordance with my invention; Fig. 2 is a face view of the reflector and casing, the door or front frame being removed; Fig. 3 is an inner face view of the front frame or door and glass and means for holding the glass in place; Fig. 4 is a detail sectional view on the line 4—4 of Fig. 3.

In carrying out my invention I employ a lamp casing 10 which in the present instance is shown of the barrel type but it will be understood that the principle of my invention is applicable to the other types of casing. The forward end of the casing is formed with an inwardly projecting flange 11 against which contacts the flange 12 of the reflector 13, there being a cushion ring of cord or fabric 14 arranged upon the seat provided between the end of the reflector 13 and the flange 12 of said reflector. This reflector is rigidly connected to the flange of the casing by means of screws 12ª. Resting against the cushion ring 14 is the glass 15 carried by the ring frame or front 16, this ring being formed at its forward edge with the inwardly extending portion 17 and at its rear end with the inwardly extending flange 18. The inwardly turned portion 17 is intended to engage the shouldered portion 15ª of the glass and in order to hold the glass securely within the frame and at the same time provide means whereby the glass can be quickly and easily fastened or unfastened, I provide a plurality of spring clips 19 which in general contour fit within the curve of the ring 16 and are bent back upon themselves as shown at 20 and hooked at 21 in order to engage the edge of the glass and are bent outwardly as shown at 22 in order to seat against the inturned flange 18 of the ring.

The clips 19 being of spring material can be quickly and easily inserted in the frame and brought into engagement with the glass and the frame at the points desired in order to hold the glass firmly within the case and prevent rattling of the same. In order to properly position the glass in the frame, it is preferred to notch the edge of the glass at one point, preferably the bottom thereof as indicated at 23 and attached to the inner side of the frame is a strip 24 bent back upon itself as shown at 25 and providing a free end 26 which fits into the notched portion 23 of the glass and the outer end 27 of this strip is projected through the frame and is apertured as shown at 28 to receive the fastening screw 29 which screws into a lug 30 projecting outwardly from the casing in line with the outwardly projecting end 27. Upon the opposite side of the case there is projected a lug 31 behind which the flange 18 of the glass carrying ring or front is hooked when the frame is placed upon the casing and in placing the frame upon the casing it will be so arranged as to bring the lugs 27 and 30 in alignment so that the fastening screw 29 can be screwed into the lug 30 for the purpose of securely binding the front or frame upon the casing. When the front or ring frame is securely fastened the glass thereof will be pressed firmly against the cushion ring carried by the reflector and inasmuch as the reflector is rigidly connected to the casing all rattling of parts will be eliminated.

It will be noted that the glass is positioned in the frame so that any prismatic structure of the glass will be properly arranged and it will also be noted that whenever it is desired to change the glass in the frame it can be quickly and easily accomplished by pressing back the spring clips so as to disengage them from the edge of the glass and a new glass can be substituted and the spring clips replaced and so long as the spring clips are in engagement with the edge of the glass the glass will be held firmly in the ring and all rattling and movement thereof prevented.

Having thus described my invention, what I claim is:

1. In an automobile lamp, the combination with a casing having oppositely disposed outwardly projecting lugs, one of which is apertured, of a ring frame adapted to fit over the end of casing and one of the lugs, a glass within the frame, said glass having a notch in the edge, a strip attached to the ring and engaging said notch at its inner end, its outer end being projected through the ring and apertured, a screw passing through said apertured end and the apertured lug of the casing whereby the ring is secured to the casing.

2. In an automobile lamp the combination with a casing having oppositely disposed outwardly projecting lugs, one of which is apertured, of a ring frame adapted to fit over the end of the casing and one of the lugs, a glass within the frame, a strip attached to the ring, its outer end being projected through the ring and apertured, a screw passing through said apertured end and the apertured lug of the casing whereby the ring is secured to the casing.

3. In an automobile lamp, the combination with a casing having oppositely disposed outwardly projecting lugs, one of which is apertured, of a ring frame adapted to fit over the end of casing and one of the lugs, a glass within the frame, a strip attached to the ring, its outer end being projected outwardly from the ring and apertured, a screw passing through said apertured end and the apertured lug of the casing whereby the ring is secured to the casing.

In testimony whereof, I hereunto affix my signature.

CLARENCE A. MICHEL.